United States Patent [19]

Bacskai

[11] 4,169,936
[45] Oct. 2, 1979

[54] CROWN ETHER AND N-ACYL PYRROLIDONE ACTIVATED COPOLYMERIZATION OF 2-PYRROLIDONE AND CAPROLACTAM

[75] Inventor: Robert Bacskai, Kensington, Calif.

[73] Assignee: Chevron Research Company, San Francisco, Calif.

[21] Appl. No.: 892,248

[22] Filed: Mar. 31, 1978

[51] Int. Cl.² .............................................. C08G 69/24
[52] U.S. Cl. .................................... 528/317; 528/312; 528/325; 528/326
[58] Field of Search ............................ 260/78 P, 78 L; 528/317, 312, 325

[56] References Cited

U.S. PATENT DOCUMENTS 4,073,778  2/1978  Collman ............................ 260/78 L

OTHER PUBLICATIONS

Angew, Chem. Internat. Edit., vol. 11, p. 16 (1972), Pedersen et al.
Translation of Czech Patent 158,341, supplied by applicant.
Chemical Abstracts, vol. 58 (1963), 1801b.
Volokhina et al., Vysokomolekul. Soedin, 5, 206–211 (1963).
Journal of Polymer Science: Part A, vol. 1, pp. 111–123 (1963), Kobayashi et al.
Journal of Polymer Science: Part A-1, vol. 5, pp. 965–974 (1967), Bar-Zakay et al.

Primary Examiner—Harold D. Anderson
Attorney, Agent, or Firm—Dix A. Newell; Thomas G. DeJonghe; Lawrence S. Squires

[57] ABSTRACT

Processes for copolymerizing 2-pyrrolidone and caprolactam to yield a copolymer which can be formed into useful shaped articles, e.g., filaments. The processes are characterized by the use of both a crown ether and an N-acyl pyrrolidone activator and the use of a limited copolymerization temperature range.

18 Claims, No Drawings

CROWN ETHER AND N-ACYL PYRROLIDONE ACTIVATED COPOLYMERIZATION OF 2-PYRROLIDONE AND CAPROLACTAM

BACKGROUND OF THE INVENTION

1. Field of the Invention

This invention relates to processes for copolymerizing 2-pyrrolidone with caprolactam and to the resulting copolymer. In another aspect, this invention relates to processes for copolymerizing 2-pyrrolidone with caprolactam wherein said copolymerization is conducted in the presence of a crown ether and an N-acyl pyrrolidone.

2. The Prior Art

Poly-2-pyrrolidone (nylon-4) is composed of repeating $C_4$ structural units

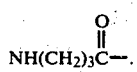

This polymer can be molded into various useful shaped articles but is primarily of commercial interest because of its ability to be shaped or extruded into filaments suitable for synthetic fabrics. Similarly, polycaprolactam (nylon 6) can also be molded into various shaped articles, but is mainly used for synthetic fibers. The copolymers of 2-pyrrolidone with caprolactam generally correspond to poly-2-pyrrolidone with some of the $C_4$ 2-pyrrolidone structural units replaced with $C_6$ caprolactam units and can also be made into filaments and other shaped articles.

Poly-2-pyrrolidone can be produced by the alkaline-catalyzed polymerization of 2-pyrrolidone in the presence of carbon dioxide, using a catalyst composed of alkali metal lactamate or tetraalkyl ammonium lactamate (see U.S. Pat. No. 3,721,652). Similarly, various alkaline-catalyzed copolymerizations of 2-pyrrolidone with caprolactam are described in J. Polymer Science Part A 1, 111 (1963) and Part A-1 5, 965 (1967), U.S. Pat. No. 3,017,393 (see Col. 4), and Czech Pat. No. 158,341. Copolymers of 2-pyrrolidone and caprolactam are also broadly named in U.S. Pat. Nos. 3,492,275 and 3,575,937 and lactam polymerization systems in which a mixture of 2-pyrrolidone and caprolactam is used as the solvent are described in U.S. Pat. Nos. 3,793,258 and 3,875,121. Chemical Abstracts, Vol. 59, 1801-B (1963) describes a publication by Volokhina et al disclosing the copolymerization of alphapiperidone with epsilon-caprolactam.

U.S. Pat. No. 4,073,778 is directed to an alkaline-catalyzed polymerization process for polymerizing lactams (e.g., 2-pyrrolidone) using crown ethers as initiators, and further generally discloses that additional initiators and/or activators, such as acetic anhydride or N-acyl lactamate may be used. This patent also broadly teaches that the process described therein may be applied to copolymerize different lactams, e.g., 2-pyrrolidone with caprolactam.

It has now been discovered that the presence of caprolactam in the reaction system described in U.S. Pat. No. 4,073,778 inhibits polymerization and greatly retards reaction rates and conversions. Accordingly, the present invention is directed to an improved copolymerization process which significantly increases reaction rates and yields and also substantially improves (increases) the molecular weight of the polymer product and the amount of caprolactam incorporated therein.

Crown ethers are macrocyclic polyethers which are neutral compounds containing 4-20 oxygen atoms each separated from the next by two or more carbon atoms. Macrocyclic polyethers have been found to form stable complexes with salts of alkali metals and other metals and ammonium salts: "Macrocyclic polyethers and their complexes", C. J. Pederson et al, ANGEW, CHEM. Internat. Edit., Vol. 11, page 16 (1972), and U.S. Pat. Nos. 3,562,295 and 3,687,978. The macrocyclic polyethers are believed to form salt-polyether complexes in which the cation is encircled by the oxygen atoms of the polyether ring and is held there by the electrostatic attraction between the cation and the negative ends of the CO dipoles. Since the stereo models of macrocyclic polyethers give a crown-like appearance, they are commonly designated as [N]-crown-M polyethers, wherein N is the total number of atoms in the polyether ring and M is the number of oxygen atoms in the polyether ring.

Crown polyethers ranging in size from cyclic tetramers of ethylene oxide ([12]-crown-4) and propylene oxide ([16]-crown-4) to 60-membered polyether rings (dibenzo[60]-crown-20) have been reported. The most effective complexing agents are said to be found among those polyethers containing 5–10 oxygen atoms each separated from the next by two carbon atoms.

SUMMARY OF THE INVENTION

In summary, the process of the invention comprises polymerizing a mixture of 2-pyrrolidone and caprolactam, in the presence of an anionic catalyst and a catalytically effective amount of a crown macrocyclic polyether, which complexes with said anionic catalyst, and an N-acyl-2-pyrrolidone at temperatures in the range of about from 50° to 100° C. to yield a copolymer of 2-pyrrolidone and caprolactam.

FURTHER DESCRIPTION OF THE INVENTION AND PREFERRED EMBODIMENTS

The copolymerization process of the present invention can be effected by contacting 2-pyrrolidone with caprolactam in the presence of an anion catalyst and a crown polyether, which complexes with said anion catalyst, and an N-acyl pyrrolidone. In order to copolymerize 2-pyrrolidone with caprolactam at reasonable reaction rates, it has now been found necessary to use an N-acyl pyrrolidone activator, in addition to the crown ether, and further to conduct the copolymerization within a certain temperature range. Hence, both the additional use of an N-acyl pyrrolidone activator and the copolymerization temperature are critical to the present invention. Thus, it has now been discovered that the copolymerization should be conducted at temperatures in the range of about from 5° to 100° C., preferably 60° to 95° C. Best results are typically obtained using temperatures in the range of about from 70° to 85° C. Temperature is also a function of caprolactam concentration; thus at 50° C. it is necessary to use relatively large amounts of caprolactam—i.e., about from 10 to 30 mol percent, whereas at 60° C. the copolymer can be obtained using 5 mol percent caprolactam.

The relative quantities of reactants and anionic polymerization catalysts and activators used are conveniently expressed based on total 2-pyrrolidone and total monomer or lactam. Thus, the term "total 2-pyrrolidone" refers to the total amount of 2-pyrrolidone present in the system including, for example, that present as reactant, solvent and as part of the anionic polymerization catalysts. The term "total monomer" or "total lactam" refers to the total 2-pyrrolidone plus the total caprolactam present. The term "total caprolactam" refers to the total amount of caprolactam present in the system.

Typically about from 1 to 30 mol percent, and preferably about from 5 to 20 mol percent of caprolactam, based on total 2-pyrrolidone is used.

A catalytically effective amount of anionic polymerization catalyst is used. Typically this will be in the range of about from 0.2 to 30 mol percent of anionic catalyst based on total monomer. With respect to the crown polyether and N-acyl activators, typically about from 0.1 to 5 mol percent, and preferably about from 1 to 2 mol percent of crown polyether, based on total monomer and about from 0.1 to 5 mol percent, preferably about from 0.5 to 1 mol percent of N-acyl pyrrolidone, based on total pyrrolidone, is used. Typically a crown polyether to anionic polymerization catalyst mol ratio in the range of about from 0.2 to 1.4 mols of crown polyether per mol of catalyst and preferably about from 0.5 to 1 is used.

The anionic catalyst used in the present process is typically and preferably a lactamate salt. This catalyst can be conveniently prepared by the reaction of a lactam with a compound having an alkaline reaction, such as, for example, alkali metal hydroxides, alkaline earth metal hydroxides, alkali metal alkoxides, alkali metals, etc. Preferably an alkali metal or a source of alkali metal or alkaline earth metal is used. Most preferably an alkali metal hydroxide such as potassium hydroxide or sodium hydroxide is used, and potassium hydroxide is most preferred. Although other lactams could be used, it is obviously most convenient to use 2-pyrrolidone or caprolactam, and best results are obtained using 2-pyrrolidone. It is further very much preferred to activate the lactamate catalyst via treatment with carbon dioxide or sulfur dioxide. The catalyst product of the treatment with carbon dioxide is commonly referred to as a "carboxylactamate". Where a carboxylactamate catalyst is used, typically about from 2 to 40 mol percent, and preferably about from 10 to 30 mol percent of the lactamate catalyst is so activated.

As noted in U.S. Pat. No. 4,073,778, the catalytic effect of the crown macrocyclic polyethers is thought to be due to their ability to form complexes with salts, specifically the lactamate salt of the present catalytic process. The complex is believed to be stabilized by encirclement of the cation of the catalyst by the oxygen atoms of the polyether ring. 1:1 salt to polyether, and other stoichiometric complexes, have been reported, C. J. Pederson, *J. Amer. Chem. Soc.* 92, page 386 (1970). Specific ranges of M, the number of oxygen atoms in the polyether ring, and N, the number of atoms in the polyether ring, are said to optimize the stability of 1:1 complexes, depending upon the diameter of the cation and the diameter of the macrocyclic polyether ring. Thus, while the [18]-crown-6 and [15]-crown-5 are generally preferred for their reported affinity for $K^+$ and $Na^+$ respectively, the choice of a particular polyether as the optimum activator for the anionic polymerization can vary with the particular cationic species of the catalyst, but can be determined by those having ordinary skill in the art by molecular diameter considerations and by routine trial-and-error optimization tests.

As in U.S. Pat. No. 4,073,778, the preferred crown cyclic polyethers are cyclic ethers having 4 through 10 units of the formula —O—X— in their ring, wherein the X substituent in each respective unit can be the same or different and is selected from radicals having the formulas

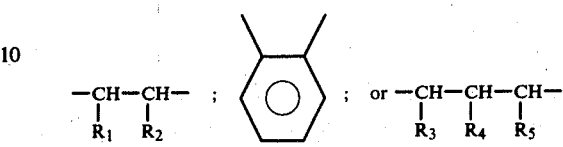

wherein $R_1$, $R_2$, $R_3$, $R_4$ and $R_5$ are independently selected from hydrogen, or $C_1-C_4$ alkyl, or $R_1$ and $R_2$ together with the carbon atoms to which they are joined form a $C_3-C_7$ cycloalkyl group; preferably cyclohexyl. Preferably $R_1-R_2$ are hydrogen or $C_1-C_4$ alkyl groups. More preferably, $R_1-R_5$ are each hydrogen or $C_1-C_2$ alkyl groups, and most preferably, they are all hydrogens.

Such macrocyclic polyethers are commonly referred to as crown cyclic polyethers or crown ethers, and have been so referred to herein, and can be designated by the shorthand nomenclature "[N]-crown-M" wherein N represents the number of atoms in the polyether ring, and M represents the number of oxygen atoms in the polyether ring. Typically N is 12-30 and M is 4-10. Each oxygen atom in the ring is separated from its adjoining oxygen atoms by two or three carbon atoms. Thus, for example, the crown nomenclature and suitable crown ethers can be exemplified by the following compound structures:

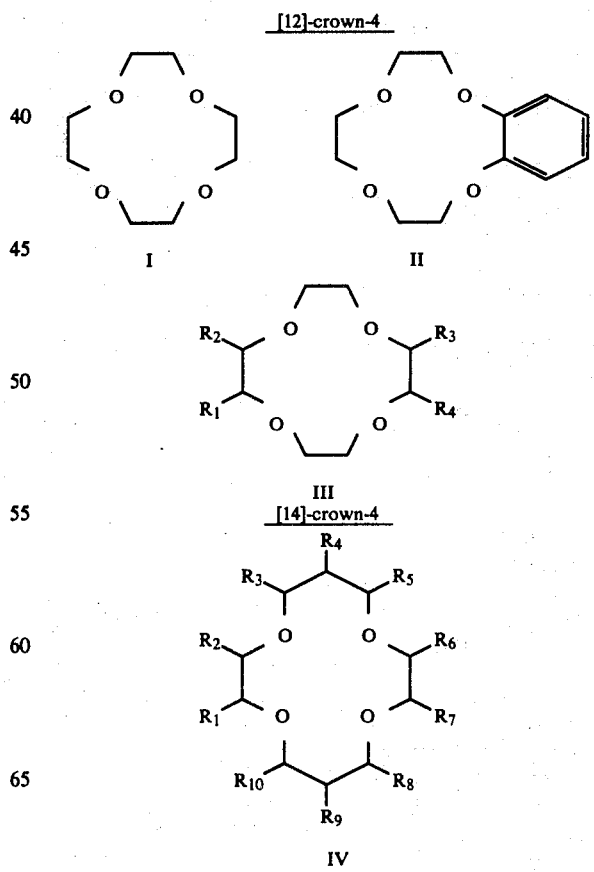

-continued

[18]-crown-6

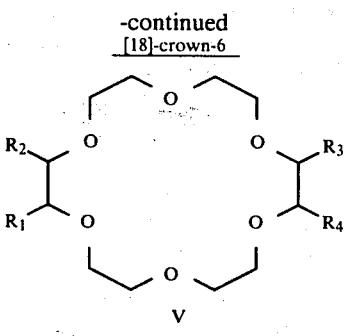

V

As used herein, unless otherwise indicated, [12]-crown-4 denotes Polyethers I–III and other macrocyclic polyethers having 12 polyether ring atoms, 4 of which are oxygen atoms separated from each other by 2-3 carbon atoms.

Polyether I is a [12]-crown-4 macrocyclic polyether which is a cyclic tetramer of ethylene oxide: 1,4,7,10-tetraoxacyclododecane.

Polyether II is a [12]-crown-4 macrocyclic polyether more uniquely named simply "benzo[12]-crown-4" and unambiguously named under the applicable IUPAC rules "7,10,13,16-tetraoxabicyclo[10.4.0]hexadeca-1(2),3,5-tirene.

Polyether III is also a [12]-crown-4 macrocyclic polyether illustrating the use of 4 —O—X— units wherein X is —CH($R_1$)—CH($R_2$)— or a phenylene group. If $R_1$, $R_2$, $R_3$ and $R_4$ are hydrogen, Polyether III becomes equivalent to Polyether I. If $R_3$ and $R_4$ are linked to form a cyclohexylene group, and the cyclohexylene group is dehydrogenated, then Polyether III becomes equivalent to Polyether II. If each of the R groups is linked to form a cyclohexylene group and the cyclohexylene groups are dehydrogenated, the resulting compound is dibenzo[12]-crown-4, or 2,5,12,15-tetraoxatricyclo[14.4.0.0$^{6,11}$]eicosa-1(16),6(7),8,10,17,19-hexene. If each of the R groups is linked to form a cyclohexylene group, the resulting tricyclomacrocyclic Polyether III is diperhydrobenzo[12]-crown-4 or dicyclohexyl[12]-crown-4, or 2,5,12,15-tetraoxatricyclo[14.4.0.0$^{6,11}$]eicosane.

Polyether IV is a [14]-crown-4 macrocyclic polyether. If all the R substituents are hydrogen, it is 1,5,8,12-tetraoxacyclotetradecane. Polyether IV consists of 4 —O—X— units wherein two X groups are —CH($R_1$)—CH($R_2$)— and two X groups are —CH($R_3$)—CH($R_4$)—CH($R_5$)— groups. If $R_1$, $R_2$, $R_6$ and $R_7$ are linked to form cyclohexylene groups, Polyether IV is dicyclohexyl[14]-crown-4, or 2,6,13,17-tetraoxatricyclo[16.4.0.0$^{7,12}$]docosane.

As used herein, unless otherwise indicated, [18]-crown-6 denotes Polyether V and all macrocyclic polyethers having 18 polyether ring atoms, 6 of which are oxygen atoms separated from each other by 2-3 carbon atoms. Polyether V is an [18]-crown-6 macrocyclic polyether having 6 —O—X— units wherein four units have only hydrogen substituents. If in the remaining two units all the R substituents are hydrogen, the polyether is 1,4,7,10,13,16-hexaoxacyclooctadecane. But if the two remaining units have the R substituents linked to form cyclohexylene groups, the polyether is dicyclohexyl[18]-crown-6, or 2,5,8,11,14,17-hexaoxatricyclo20.4.0.$^{11,16}$]hexacosane. Alternatively, the R substituents may be linked to form dibenzo[18]-crown-6.

Suitable crown ethers (macrocyclic polyethers) which can be used are, for example, described above and in U.S. Pat. Nos. 3,687,978 and 3,562,295. In general, these crown ethers are those described above; preferably those having N equal 12–18 and M equal 4–6, and most preferably those having N equal 15–18 and M equal 6. A preferred class of crown ether polymerization activators are macrocyclic polyethers selected from tetra-, penta- and hexaoxacyclo($C_8$–$C_{30}$) alkanes or alkenes containing a 12–18 membered polyether ring. Other rings, if any, present in this class of crown ethers are $C_6$ aromatic rings, e.g., dibenzo[18]-crown-6.

The crown polyethers can be synthesized by known methods, such as, for example, described by G. W. Gokel et al, in the J. Org. Chem., Vol. 39, p. 2445 (1974). For example, the crown ethers can generally be prepared from a linear polyether having halide and alkoxide functions at opposite ends to close the ring, thus yielding a macrocyclic polyether by ring closure; or two linear polyethers, each terminally functionalized as above, can be joined to form a ring. Catechol can be used to introduce phenylene groups into the polyether. Saturated ethers can be prepared from the corresponding aromatic ones by catalytic hydrogenation. Further information concerning crown ether nomenclature and the preparation of such ethers can be found in the J. Am. Chem. Soc., V. 89:26, pp. 7017–7036, Dec. 20, 1967.

In a preferred embodiment of the invention, an alkali metal hydroxide (preferably potassium hydroxide) is added to excess 2-pyrrolidone in an amount from 0.2–30 mol percent, preferably about 1–20 mol percent, and most preferably about 10 mol percent, based on total 2-pyrrolidone. Total 2-pyrrolidone consists of the 2-pyrrolidonate catalyst, 2-pyrrolidone provided as solvent for the catalyst, 2-pyrrolidone catalyst having formed an adduct or complex with an activator or initiator, and any additional 2-pyrrolidone charged to the reactor. The alkali metal hydroxide reacts wth 2-pyrrolidone to form a solution of alkali metal pyrrolidonate and water in 2-pyrrolidone. Preferably the crown ether has alreadly been added to the 2-pyrrolidone or is then added. The crown ether could also be added at any stage up to polymerization; however, by analogy to the homopolymerization, best results are obtained by adding the crown ether prior to the activation of the lactamate catalyst with carbon dioxide or sulfur dioxide, and preferably before dehydration. The crown polyether is added in a catalytically effective amount, typically about from 0.1 to 5 mol percent, based on total pyrrolidone. Mixtures of different crown polyethers can be used. About from 1 to 30 mol percent caprolactam, based on total 2-pyrrolidone, is added and the solution dehydrated until it contains less than about 0.1–0.2 weight percent water.

Carbon dioxide, or sulfur oxide, preferably carbon dioxide, is then added in an amount corresponding to about 5–80, preferably 10–50, mol percent of the alkali metal 2-pyrrolidonate present in solution.

A catalytically effective amount of an N-acyl pyrrolidone is then added (typically about from 0.1–5 mol percent, based on total pyrrolidone) and the mixture then copolymerized at about from 50° to 100° C., preferably 60°–95° C., for about from 2 to 40 hours.

It is important to add the N-acyl pyrrolidone after dehydration because it is sensitive to the temperatures encountered during dehydration. The N-acyl pyrrolidone can also be generated in situ by the addition of a compound which reacts with 2-pyrrolidone to yield N-acyl pyrrolidone, such as, for example, acyloxy anhydrides. And, in fact, in commercial operation it is more desirable from a pure cost standpoint to use acetic anhydride to generate N-acetyl pyrrolidone in situ than to actually add N-acetyl pyrrolidone.

The 2-pyrrolidone-caprolactam copolymer product can be recovered by any suitable procedure; e.g., washing, extraction, filtration, etc. The copolymer product typically contains about from 0.1 to 20 mol percent of caprolactam units and the remainder 2-pyrrolidone units. By varying the relative amounts of 2-pyrrolidone and caprolactam in the polymerization mixture, the relative ratio of pyrrolidone units and caprolactam units in the copolymer can be varied. The copolymer product can be formed into fibers, filaments, films, and other useful shaped articles.

The polymerization can be carried out in bulk or solution or dispersion, with stirring or without stirring, with inert nonsolvents, or without same, as benefits the particular polymerization reaction. The process can be conducted as a batch process or as a continuous process or as a semi-continuous process.

2-Pyrrolidone and caprolactam are, of course, well known compounds and can be obtained from known sources or prepared by known procedures. Also, as it is well recognized in the polymerization art, it is greatly preferred to use high-purity monomers because certain impurities which may be present with the monomer can interfere deleteriously with polymerization. Purification of the monomer to polymerization grade can be achieved by any suitable purification techniques, e.g., distillation, and such procedures are also well known to the art.

Where typical conditions have been given herein, it should be appreciated that the process can also be conducted using conditions both above and below those specified, though typically with poorer results or economics.

Definitions

As used herein, the following terms have the following meanings, unless expressly stated to the contrary.

The term "pyrrolidone" refers to 2-pyrrolidone.

The term "caprolactam" refers to epsilon-caprolactam.

The term "N-acyl pyrrolidone" or N-acyl-2-pyrrolidone refers to groups having the formula

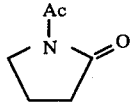

wherein Ac is an acyl group having from 2 through 8 carbon atoms and preferably is a branched-chain or straight-chain alkanoyl or benzoyl.

As used herein, the term "shaped articles" is a generic term referring broadly to one or more useful products which are generally referred to as plastic or in that context as synthetic (e.g., synthetic fibers). The term thus includes, for example, filaments, films, sheets, containers, moldings, equipment cases and parts, etc.

Also, as previously noted, the term "total 2-pyrrolidone" or "total pyrrolidone" refers to the total amount of 2-pyrrolidone in the system including, for example, that present as reactant, solvent, and as part of the anionic polymerization catalyst (e.g., alkali metal 2-pyrrolidonate and alkali metal carboxy-2-pyrrolidonate).

The term "total caprolactam" refers to the total amount of epsilon-caprolactam in the system.

The term "total lactam" refers to the sum of total 2-pyrrolidone and total caprolactam.

The term "total monomer" is synonomous with the term "total lactam."

EXAMPLES

A further understanding of the invention can be had from the following non-limiting examples.

EXAMPLE 1

In this example a number of copolymerizations were attempted using: (1) polymerization systems containing neither a crown ether nor an N-acyl pyrrolidone; (2) polymerization systems containing a crown ether; (3) polymerization systems containing an N-acyl pyrrolidone; and (4) polymerization systems of the present invention containing both a crown ether and an N-acyl pyrrolidonen. In each instance, the polymerizations were respectively conducted at temperatures of 50° C., 60° C., 70° C. and 80° C. for 22 hours using polymerization systems containing 5 mol percent epsilon-caprolactam, and for comparison homopolymerization systems which did not contain any caprolactam. With the exception of the addition of, or the absence of, the crown ether and/or N-acyl pyrrolidone each comparison run was conducted under identical conditions.

50 g (0.59 mol) of 2-pyrrolidone; 0.78 g (0.01175 mol) of 85.5% potassium hydroxide pellets and, in the experiments where a crown ether was used, 2.19 g (0.0083 mol) of the [18]-crown-6 ether 1,4,7,10,13,16-hexaoxacyclooctadecane. The mixture was then heated to incipient distillation (about 110° C./2 mm Hg) for about 9 minutes to remove water and then cooled to room temperature (about 30° C.). Carbon dioxide was then bubbled through the mixture until 0.16 g (0.0036 mol) had been taken up by the mixture (i.e., reacted with the potassium pyrrolidonate). This provided a mixture having a total concentration of potassium 2-pyrrolidonate and potassium carboxy-2-pyrrolidonate of 2 mol percent, based on total 2-pyrrolidone. The mixture was then divided into several portions and poured into polymerization bottles, some of which contained 0.10 g (0.79×10$^{-3}$ mol) of N-acetyl pyrrolidone and/or 0.85 g (7.5×10$^{-3}$ mol) caprolactam and then polymerized at the indicated temperature for 22 hours. The respective portions were sized to provide the composition ranges indicated in the following tables. The resulting product was then cut into granules, washed with CHCl$_3$ and H$_2$O until the filtrate had a pH of 6.5 and dried at 70° C. in vacuum.

The results of these experiments are summarized in the following tables, wherein Table 1 is a comparison table showing the effectiveness of all of the systems tested to homopolymerize 2-pyrrolidone (in the absence of caprolactam), and Table 2 summarizes the results of attempted copolymerization wherein the polymerization mixture contained 5 mol percent epsilon-caprolactam (based on pyrrolidone). Table 3 is a summary of systems using both a crown ether and N-acyl pyrrolidone, showing the effect of polymerization temperature.

All molecular weights are reported as the weight average molecular weight and were determined from the specific viscosity of 0.1 g of polymer/100 cc of m-cresol solution at 25° C. All reported percentages are mol percent unless otherwise indicated. Percent conversion is calculated as 100×(weight of polymer)/weight of total monomer), wherein total monomer is pyrrolidone plus pyrrolidone in potassium carboxypyrrolidonate.

TABLE 1

Homopolymerization of 2-Pyrrolidone*[1]

| Activator Additive Mol %*[2] | Temp., °C. | Conversion*[3], % | $\overline{M}w \times 10^{-3}$ |
|---|---|---|---|
| None | 50 | 17 | 310 |
| None | 60 | 14 | 200 |
| None | 70 | 13 | 200 |
| None | 80 | 0 | — |
| 0.67 NAP*[4] | 50 | 77 | 160 |
| 0.67 NAP | 60 | 71 | 160 |
| 0.67 NAP | 70 | 53 | 55 |
| 0.67 NAP | 80 | 13 | 10 |
| 1.4 Crown*[5] | 50 | 50 | 340 |
| 1.4 Crown | 60 | 14 | 48 |
| 1.4 Crown | 70 | 3 | 10 |
| 1.4 Crown | 80 | 0 | — |
| 1.4 Crown + 0.67 NAP | 50 | 77 | 94 |
| 1.4 Crown + 0.67 NAP | 60 | 76 | 82 |
| 1.4 Crown + 0.67 NAP | 70 | 75 | 82 |
| 1.4 Crown + 0.67 NAP | 80 | 41 | 16 |

*[1]No caprolactam is present.
*[2]Mol % based on total pyrrolidone.
*[3]Based on isolated polymer at 22 hours.
*[4]NAP is N-acetyl-2-pyrrolidone.
*[5][18]-crown-6 ether, i.e., 1,4,7,10,13,16-hexaoxacyclooctadecane.

From the above table, it can be seen that each system was effective to homopolymerize 2-pyrrolidone over a part of the temperature range and that when higher polymerization temperatures were used both the conversion and quality of the product drastically decreased, so much so that at polymerization temperatures of 80° C. the systems using no additive or only the crown ether failed to produce any polymer.

TABLE 2

Copolymerization of 2-Pyrrolidone with 5 mol percent Epsilon-Caprolactam*[1]

| Activator Additive Mol %*[1] | Temp., °C. | Conversion*[2], % | $Mw \times 10^{-3}$ | % Caprolactam*[5] Units in Polymer |
|---|---|---|---|---|
| — | 50 | 8 | 100 | 0 |
| — | 60 | 0 | — | — |
| — | 70 | 0 | — | — |
| — | 80 | 0 | — | — |
| 0.67 NAP*[3] | 50 | 47 | 66 | 0 |
| 0.67 NAP | 60 | 42 | 74 | 0 |
| 0.67 NAP | 70 | 33 | 22 | 0.5 |
| 0.67 NAP | 80 | 20 | 17 | 0.5 |
| 1.4 Crown*[4] | 50 | 5 | 35 | 0 |
| 1.4 Crown | 60 | 2 | 12 | 0 |
| 1.4 Crown | 70 | 0 | — | — |
| 1.4 Crown | 80 | 0 | — | — |
| 1.4 Crown + 0.67 NAP | 50 | 72 | 98 | 0 |
| 1.4 Crown + 0.67 NAP | 60 | 64 | 60 | 1 |
| 1.4 Crown + 0.67 NAP | 70 | 54 | 36 | 2 |
| 1.4 Crown + 0.67 NAP | 80 | 41 | 23 | 3 |

*[1]Mol % based on total pyrrolidone.
*[2]Based on isolated polymer at 22 hours.
*[3]NAP is N-acetyl-2-pyrrolidone.
*[4][18]-crown-6 ether, i.e., 1,4,7,10,13,16-hexaoxacyclooctadecane.
*[5]Mol % based on the total of pyrrolidone units and caprolactam units, estimated from NMR (nuclear magnetic resonance) spectra.

Thus, from the above table, it can be seen that at a polymerization temperature of 50° C., none of the systems was capable of producing a copolymer of 2-pyrrolidone and caprolactam, although they were all still capable of homopolymerizing 2-pyrrolidone, as can be seen from Table 1. At polymerization temperatures of 60° to 80° C., the system which contained neither the crown ether nor the N-acetyl pyrrolidone was no longer capable of even producing measurable amounts of the homopolymer. Similarly, at polymerization temperatures of 60° to 80° C., the system containing only the crown ether was also incapable of even producing measurable amounts of homopolymer. At polymerization temperatures of 70° and 80° C., the system using only N-acetyl pyrrolidone was able to produce a copolymer containing 0.5 mol percent caprolactam units, whereas the system of the present invention was able to produce higher conversions of higher molecular weight copolymers containing 2 and 3 mol percent caprolactam units, respectively. At 60° C., the process of the present invention was the only system which produced a copolymer. Also, it should be noted that even with respect to the process of the invention that although the amount of caprolactam units in the copolymer increase with higher polymerization temperatures, that both the conversion and molecular weight of the product decreased.

EXAMPLE 2

In this example, the procedure of Example 1 was repeated using 20 mol percent caprolactam for (1) systems containing only the crown ether and (2) systems of the present invention containing both the crown ether and the N-acyl-2-pyrrolidone. The results of these experiments are summarized in the following Table 3.

TABLE 3

Copolymerization of 2-Pyrrolidone with 20 mol percent Epsilon Caprolactam*[1]

| Activator Additive Mol %*[1] | Temp., °C. | Conversion*[2] % | $Mw \times 10^{-3}$ | % Caprolactam*[5] Units in Polymer |
|---|---|---|---|---|
| 1.4 Crown*[4] | 50 | 0 | — | — |
| 1.4 Crown | 60 | 0 | — | — |
| 1.4 Crown | 70 | 0 | — | — |
| 1.4 Crown | 80 | 0 | — | — |
| 1.4 Crown + 0.67 NAP*[3] | 50 | 40 | 21 | 4 |
| 1.4 Crown + 0.67 NAP | 60 | 34 | 15 | 5 |
| 1.4 Crown + 0.67 NAP | 70 | 32 | 17 | 10 |
| 1.4 Crown + 0.67 NAP | 80 | 31 | 13 | 13 |

*[1]Mol % based on total pyrrolidone.
*[2]Based on isolated polymer at 22 hours.
*[3]NAP is N-acetyl-2-pyrrolidone.
*[4][18]-crown-6-ether, i.e., 1,4,7,10,13,16-hexaoxacyclooctadecane
*[5]Mol % based on the total of pyrrolidone units and caprolactam units, estimated from NMR (nuclear magnetic resonance) spectra.

From the above table, it can be seen that the system containing only the crown ether failed to produce any copolymer and further failed to even produce measurable amounts of the homopolymer at any of the polymerization temperatures, whereas the process of the present invention produced copolymer containing significant amounts of caprolactam units at every polymerization temperature. Again, it should be noted that although the number of units of caprolactam in the polymer increased with increasing polymerization temperatures, the conversions and the molecular weight of the copolymer decreased. Further, as compared with the system containing 5 mol percent caprolactam in the polymerization mixtures, the copolymer products of the 20 mol percent caprolactam system containing substantially more caprolactam units but have poorer molecular weight and were produced in poorer conversions.

Obviously, many modifications and variations of the invention, described hereinabove and below in the claims, can be made without departing from the essence and scope thereof.

What is claimed is:

1. A process for copolymerizing 2-pyrrolidone with caprolactam to form a copolymer capable of being made into shaped articles which comprises contacting 2-pyrrolidone with about from 1 to 30 mol percent of epsilon-caprolactam, based on total 2-pyrrolidone, under substantially anhydrous conditions at temperatures in the range of about from 50° to 100° C. in the presence of a catalytically effective amount of an anionic catalyst and a catalytically effective amount of an N-acyl pyrrolidone and a crown cyclic polyether, having 12 through 30 atoms in its polyether ring, including 4 through 10 oxygen atoms and wherein said oxygen atoms are separated from each other by two or three carbon atoms, which is capable of forming a complex with said anionic catalyst.

2. The process of claim 1 wherein said 2-pyrrolidone and said caprolactam are contacted at temperatures in the range of about from 60° to 95° C.

3. The process of claim 1 wherein said 2-pyrrolidone and said caprolactam are contacted at temperatures in the range of about from 70° to 85° C.

4. The process of claim 1 wherein said anion catalyst is a lactamate salt.

5. The process of claim 4 wherein said anion catalyst is activated via treatment with carbon dioxide prior to said copolymerization.

6. The process of claim 4 wherein said lactamate salt is an alkali metal lactamate.

7. The process of claim 6 wherein said anion catalyst is activated via treatment with carbon dioxide prior to said copolymerization.

8. The process of claim 1 wherein said 2-pyrrolidone is contacted with about from 5 to 20 mol percent of said caprolactam, based on total 2-pyrrolidone.

9. The process of claim 1 wherein said process is conducted in the presence of about from 0.1 to 5 mol percent of said crown ether, based on total monomer.

10. The process of claim 1 wherein said process is conducted in the presence of about from 0.1 to 5 mol percent of said N-acyl pyrrolidone, based on total monomer.

11. The process of claim 1 wherein said process is conducted in the presence of about from 0.2 to 30 mol percent of said anion catalyst, based on total monomer.

12. The process of claim 1 wherein said N-acyl pyrrolidone is generated in situ by the addition of an acyloxy anhydride to said 2-pyrrolidone.

13. The process of claim 1 wherein said crown cyclic polyether has 12–18 carbon atoms and 4–6 carbon atoms in its polyether ring.

14. The process of claim 1 wherein said crown cyclic polyether is selected from the group of crown cyclic polyethers having from 4 to 10 units having the formula —O—X—, wherein X in each of said units is independently selected from the group consisting of radicals having the formulas

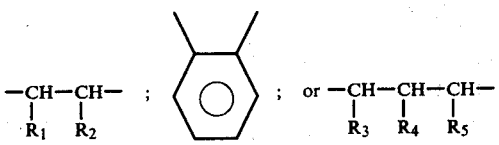

wherein $R_1$ and $R_2$ are independently selected from the group consisting of hydrogen and lower alkyl or wherein $R_1$ and $R_2$ together with the carbon atoms to which they are joined form a cycloalkyl having from 3 to 7 carbon atoms, and $R_3$, $R_4$ and $R_5$ are independently selected from the group consisting of hydrogen and lower alkyl, and mixtures thereof.

15. The process of claim 14 wherein said 2-pyrrolidone is contacted with about from 5 to 20 mol percent of said caprolactam, based on total 2-pyrrolidone, at temperatures in the range of about from 60° to 95° C. and wherein said anionic catalyst is a mixture of an alkali metal 2-pyrrolidonate and an alkali metal carboxy-2-pyrrolidonate.

16. The process of claim 15 wherein said process is conducted in the presence of about from 0.1 to 5 mol percent of said crown cyclic polyether, based on total monomer.

17. The process of claim 16 wherein x is the group —CH$_2$—CH$_2$— or —CH$_2$—CH$_2$—CH$_2$—.

18. The process of claim 17 wherein said crown cyclic polyether is 1,4,7,10,13,16-hexaoxacyclooctadecane.

* * * * *

UNITED STATES PATENT AND TRADEMARK OFFICE
CERTIFICATE OF CORRECTION

PATENT NO. : 4,169,936
DATED : October 2, 1979
INVENTOR(S) : Robert Bacskai

It is certified that error appears in the above—identified patent and that said Letters Patent are hereby corrected as shown below:

Column 2, line 56, "5°" should read --50°--.

Column 4, line 12, "  " should read -- 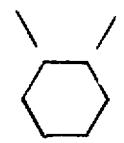 --.

Column 5, line 65, "clo20.4.0.$^{11,16}$]" should read --clo[20.4.0.$^{11,16}$]--.

Signed and Sealed this

First Day of January 1980

[SEAL]

Attest:

SIDNEY A. DIAMOND

*Attesting Officer*     *Commissioner of Patents and Trademarks*